United States Patent
Heo

(10) Patent No.: US 12,126,952 B2
(45) Date of Patent: Oct. 22, 2024

(54) METHOD FOR CONTROLLING VOLUME OF TRUE WIRELESS STEREO EARPHONE USING BLUETOOTH

(71) Applicant: MOBIFREN CO., LTD, Gumi-si (KR)

(72) Inventor: Ju Won Heo, Gumi-si (KR)

(73) Assignee: MOBIFREN CO., LTD, Gumi-si (KR)

( * ) Notice: Subject to any disclaimer, the term of this patent is extended or adjusted under 35 U.S.C. 154(b) by 80 days.

(21) Appl. No.: 17/799,628

(22) PCT Filed: Jul. 7, 2021

(86) PCT No.: PCT/KR2021/008622
§ 371 (c)(1),
(2) Date: Aug. 15, 2022

(87) PCT Pub. No.: WO2022/025470
PCT Pub. Date: Feb. 3, 2022

(65) Prior Publication Data
US 2023/0073202 A1    Mar. 9, 2023

(30) Foreign Application Priority Data
Jul. 27, 2020    (KR) .................. 10-2020-0093056

(51) Int. Cl.
*H04R 1/10*    (2006.01)
*G06F 3/041*    (2006.01)

(52) U.S. Cl.
CPC ............. *H04R 1/10* (2013.01); *G06F 3/041* (2013.01); *H04R 2430/01* (2013.01)

(58) Field of Classification Search
CPC .... H04R 1/10; H04R 1/1016; H04R 2430/01; G06F 3/041; H03G 5/02; H03G 5/00; H03G 5/025; H03G 3/02
(Continued)

(56) References Cited

U.S. PATENT DOCUMENTS
10,448,093 B2    10/2019  Zeng et al.

FOREIGN PATENT DOCUMENTS
CN    105763988 A    7/2016
KR    10-0429605 B1    5/2004
(Continued)

OTHER PUBLICATIONS

International Search Report issued on Oct. 14, 2021, for corresponding International Patent Application No. PCT/ KR2021/008622, along with an English translation.
(Continued)

*Primary Examiner* — Ahmad F. Matar
*Assistant Examiner* — Sabrina Diaz
(74) *Attorney, Agent, or Firm* — Hauptman Ham, LLP

(57) ABSTRACT

Disclosed is a method for controlling volume of a true wireless stereo bluetooth earphone including a pair of left and right touch switches, the method including recognizing a user's touch during media playback or a phone call; determining whether the touch is a shorter touch or a longer touch than a configuration time; increasing the volume by one increment while entering a volume-up mode when the touch is a short touch, according to the determining; determining whether there is an additional short touch within the configuration time; returning to the increasing of the volume by one increment each time there is an additional short touch, according to the determining; returning to checking whether a first volume control mode is entered by existing the volume-up mode when there is no touch for the configuration time; and several additional determining.

1 Claim, 4 Drawing Sheets

(58) Field of Classification Search
USPC ................................ 381/109, 104, 370, 380
See application file for complete search history.

(56) References Cited

FOREIGN PATENT DOCUMENTS

| KR | 10-0953835 B1 | 4/2010 |
|---|---|---|
| KR | 20-0468763 Y1 | 9/2013 |
| KR | 10-1727185 B1 | 5/2017 |
| KR | 10-2063342 B1 | 1/2020 |

OTHER PUBLICATIONS

Written Opinion issued on Oct. 14, 2021, for corresponding International Patent Application No. PCT/KR2021/008622.

METHOD FOR CONTROLLING VOLUME OF TRUE WIRELESS STEREO EARPHONE USING BLUETOOTH

CROSS-REFERENCE TO RELATED APPLICATION

The present application is a national stage filing under 35 U.S.C § 371 of PCT application number PCT/KR2021/008622 filed on Jul. 7, 2021, which is based upon and claims the benefit of priority to Korean Patent Application No. 10-2020-0093056, filed on Jul. 27, 2020, in the Korean Intellectual Property Office. All of the aforementioned applications are incorporated herein by reference in their entireties.

TECHNICAL FIELD

The present disclosure relates to a method for controlling the volume of a true wireless stereo earphone using Bluetooth and, more particularly, to a method for controlling the volume of a true wireless stereo (TWS) Bluetooth earphone in which left and right earphones operate individually and independently to be connected to a sound source generator according to a Bluetooth communication protocol.

BACKGROUND ART

In recent years, according to the spread of various audio devices, particularly smartphones, Bluetooth earphones having various shapes and functions have been widely used in place of the conventional wired earphones, and have been generalized and become widely used.

In the prior art, most of the Bluetooth earphones operate in a wireless manner in which the left and right earphones are connected to each other by wire and a Bluetooth unit provided in any one of the left and right earphones is connected to the main body of an audio device to receive a signal.

However, in recent years, as shown in FIG. 1, the left and right Bluetooth earphones ER and EL are provided as separate Bluetooth units, whereby they are independently operated by Bluetooth connection.

In other words, by configuring a left and right-independent earphone connection method in a manner that the main body of the audio device and one of the left and right Bluetooth earphones ER and EL are first connected to each other via Bluetooth, and then the other Bluetooth earphone ER or EL is connected to the first connected Bluetooth earphone ER or EL via Bluetooth, so-called true wireless stereo (TWS) Bluetooth earphones, which completely exclude the wire between the left and right earphones, are popular.

Various methods of adjusting the volume in the TWS Bluetooth earphone described above may be employed.

In most TWS Bluetooth earphones (hereinafter, referred to as "Bluetooth earphones"), the main body of the Bluetooth unit is miniaturized to improve portability, thereby limiting the number and size of operation buttons provided to users.

Accordingly, most Bluetooth earphones are provided with a single mechanical button for operation or a touch surface (TR or RL in FIG. 1) as a user-sensitive touch switch on the left and right sides thereof, and there is a limitation in the operation method of the left and right earphones that can be combined.

In particular, there are many limitations in the implementation of a volume control function that must perform an opposite function operation of up-down.

For this reason, the transmitted volume of the Bluetooth earphone is adjusted by the main body of the audio device so that volume control is not possible in many Bluetooth earphones itself.

Alternatively, there is a product in which the volume decreases when a touch or push button of a touch switch provided on the left (or right) is pressed at the time of adjusting the volume, and the volume increases when the touch or push button of the touch switch on the right (or left) is pressed. However, in the case of such a product, when the user uses the Bluetooth earphones in a single mode (when only one side of the Bluetooth earphones is used), there is a problem in that it is fundamentally impossible to adjust volume up-down.

In some high-priced products, the touch switch is configured in a small touchpad type, so that when the user touches and slides the operation surface of the touchpad upwards with his or her finger, the volume goes up, and when the user touches and slides the operation surface downwards, the volume goes down.

Another product that controls volume up-down by adding a separate button also exists.

However, when configuring such a small touchpad type touch switch or adding the separate button, an increase in the number of parts and an increase in assembly man-hours may cause a significant increase in product price, which is a very sensitive factor in the market, and the size of the Bluetooth earphone unit itself becomes large due to the limitation of miniaturization, so that it does not meet the consumer's taste.

In addition, as a major prior patent related to the present disclosure, there is a "METHOD FOR CONTROLLING VOLUME OF WIRELESS HEADSET IN PORTABLE PHONE ONBOARD BLUETOOTH" of Korean Patent No. 10-0429605 (registration: Apr. 19, 2004).

In the above-described patent, there is disclosed a method for controlling the volume of a wireless headset including a Bluetooth module, which is a communication auxiliary terminal according to a communication terminal having a Bluetooth function, a speaker, a microphone, and a power switch provided to turn on/off the power by being pressed by a user, which are provided on the outside of a main body of the wireless headset. The method includes checking a key input duration of the power switch in a standby mode of the wireless headset; adjust the ring volume of the wireless headset in response to the number of the key inputs when the key input of the power switch is less than 1 second; and performing the on/off function of the power when the key input of the power switch is equal to or longer than 3 seconds.

However, as shown in the flowchart of a specific volume control operation disclosed in FIG. 4, the technology of this patent has the following disadvantages.

Each time the power switch is operated, the volume increases by one increment only in one direction: Small→Medium→Large or Large→Medium→Small, and since the volume increases or decreases in one direction, when it is determined that the sound is too loud or too low while adjusting the volume, there is a serious problem in use that the volume cannot be immediately decreased or increased.

That is, the user can increase the volume up to the maximum configuration level and then decrease the volume in order to lower the volume because the user thinks the volume is too high while increasing the volume. Accordingly, when a limit of the maximum volume is not configured, sensitive users may be surprised, or some users, such as children, may even damage their hearing.

In addition, in the related U.S. Pat. No. 10,448,093 (Oct. 15, 2019), there is a related patent for improving sound quality by obtaining and adjusting the average value of the volume, but the technical field is different from the present disclosure.

DISCLOSURE

Technical Problem

In the conventional products, by requiring additional operating members in addition to the basic function keys, the configuration of the TWS Bluetooth earphone, which is a very important technical point of view of miniaturization and light weight, becomes complicated, and the manufacturing cost is also increased.

Therefore, there is a need to use the basic operating members provided in a typical Bluetooth earphone and solve it by software.

Technical Solution

The present disclosure has been made in order to solve the above-mentioned problems in the prior art.

An aspect of the present disclosure is to provide a method for controlling the volume of a true wireless stereo bluetooth earphone including a pair of left and right independent earphones, and one or more function switches in the earphone as a touch switch or a mechanical button switch that responds to a user's touch, and the method is implemented during media playback or phone calls. The method may include recognizing a user's touch on the touch switch of the Bluetooth earphone; determining whether the touch on the touch switch is a short touch or a long touch determined based on a configuration time; increasing the volume by one increment while immediately entering a volume-up mode when the touch on the touch switch is a short touch, according to the determining; determining whether there is an additional short touch on the touch switch within the configuration time; returning to the increasing of the volume by one increment each time there is an additional short touch, according to the determining; returning to checking whether a first volume control mode is entered by existing the volume-up mode when there is no touch on the touch switch for the configuration time; decreasing the volume by one increment by entering a volume-down mode when the touch on the touch switch is the long touch for a relatively long configuration time in the determining of whether the touch on the touch switch is the short touch or the long touch; determining whether the touch switch is continuously touched in the volume-down mode; and returning to the decreasing of the volume by one increment for each configuration time when the touch switch is continuously touched.

Advantageous Effects

According to the method for controlling the volume of the TWS Bluetooth earphone according to the present disclosure, by using a button or a touch switch, which is a typical single function switch and changing the operation logic of the function switch without a separate mechanical button or the use of additional parts such as a touch switch type operation pad, it is possible to easily control the volume of the TWS Bluetooth earphone to increase customer convenience and improve product quality.

BEST MODE

Figure 1:
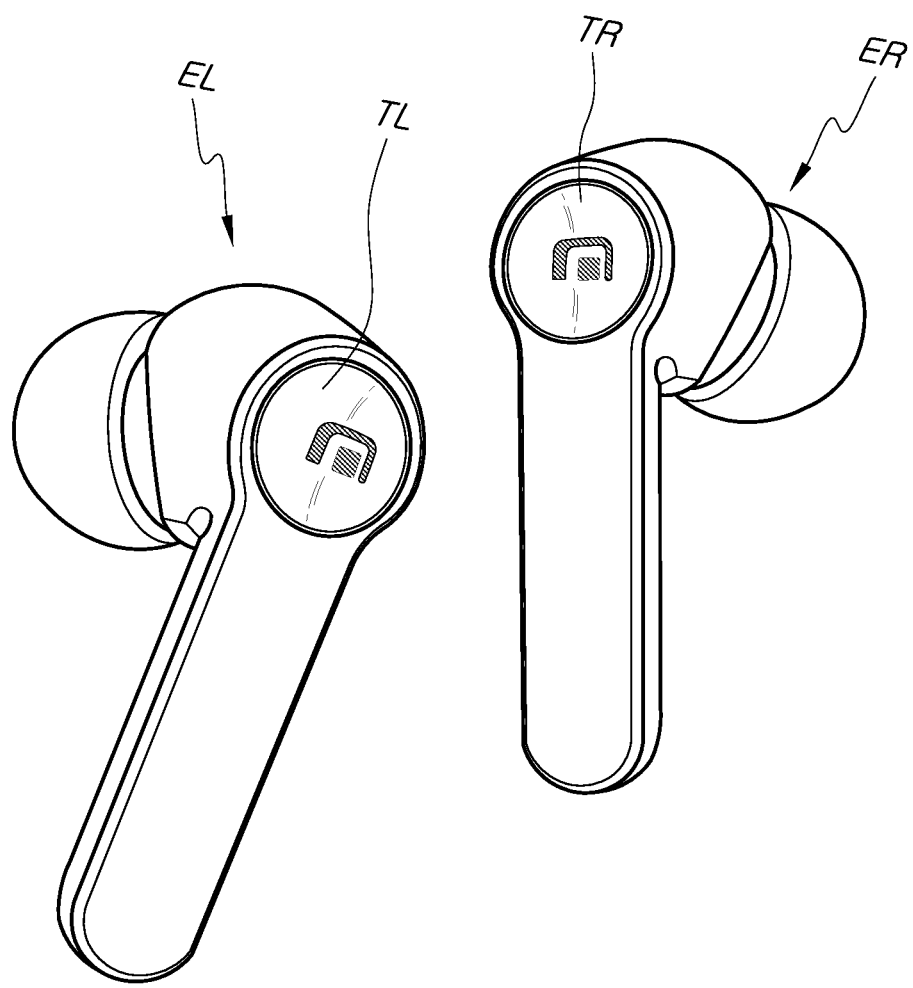
FIG. 1 is an external perspective view showing an exemplary pair of a Bluetooth type of true wireless stereo earphone to which a Bluetooth earphone of the disclosure.

The operation of a button or a touch switch provided in the TWS Bluetooth earphone according to the prior art is performed generally in the following manners.

Power-on: When touching (pressing the button) any one of the left and right Bluetooth earphones for a designated time (e.g., 5 seconds) or longer.

Music play: When quickly touching (pressing the button) any one of the left and right Bluetooth earphones several times (e.g., 2 times) or more.

Play next song: When touching (pressing the button) the right Bluetooth earphone 3 times during music play.

Play previous song: when touching (pressing the button) the left Bluetooth earphone 3 times during music play.

Answer or end call: When quickly touching (pressing the button) the left or right Bluetooth earphone twice.

Call rejection: When touching (pressing the button) the left or right Bluetooth earphone for a designated time (e.g., 2 seconds).

In the operation combination of the single touch switch or function button, the method for controlling the TWS Bluetooth earphone of the present disclosure provides a method that functions as a means for varying the volume in a music playback mode by determining the degree of operation time of the touch (or button operation: in the following, only "touch" is indicated).

The user does not feel the need to control the volume because the user cannot detect the current volume state of the Bluetooth earphone with the naked eye or by hearing before playing music.

Therefore, the method of the present disclosure implements its operation logic only during media playback such as music or during a phone call.

When any one of touch switches TR and TL of the left and right earphones E is touched, a control unit of a typical Bluetooth earphone E determines whether the touch is a short touch or a long touch.

In general, the short touch is configured to be about 50 to 500 m sec and the long touch is configured to be 1000 m sec or more, but this may be configured by various experimental statistics according to the user's sense in design.

As to a single touch and a continuous touch, it is preferable that when a touch is made within 1 second, the touch may be determined to be the single touch, and when a touch is made two or more times consecutively within 1 second, the touch may be determined to be the continuous touch, but the single touch and the continuous touch may also be configured differently by the developer.

MODE FOR INVENTION

Hereinafter, only the "touch" method will be described based on the case where the function key is a touch switch. However, in the case of the button type, obviously, the same operation is possible and can be replaced by mechanical pressing the button or other types of switches (e.g., a joystick type switch or a dome type membrane switch).

Embodiment 1

A method for controlling a TWS Bluetooth earphone of the present disclosure will be described with reference to the flowchart of FIG. 2.

When a user's touch on the touch switch TR or TL of the Bluetooth earphone E is recognized in operation S10 during media playback or a phone call, it is determined whether the user's touch is a "short touch" or a "long touch" according to a predetermined time in operation S20.

When the touch is determined to be the short touch within a configuration time (a reference time configured to determine whether the touch is the short touch or the long touch), the method may increase the volume by one increment in operation S30 while immediately entering a volume-up mode.

This instantaneous one-step increase in volume may allow the user to immediately recognize entering the volume-up control mode, thereby improving the user's clarity of operation recognition.

Next, whether there are more short touches within the predetermined time (e.g., 10 seconds) is further determined in operation S40, and the method returns to a routine of sequentially increasing the volume by one increment in operation S30 whenever there are more short touches.

When there is no touch on the touch switch TR or TL for the predetermined time (e.g., 10 seconds) in this operation state, the method returns to a state of checking whether a first volume control mode is entered while existing the volume-up mode (In the device of the present disclosure, when a short touch is touched twice, music stop or call end is configured).

In addition, as described above, when there is the user's touch on the touch switch TR or TL,
the device determines whether the touch is a short touch or a long touch in operation S20, and decreases the volume by one increment in operation S130 while entering a volume-down mode when the touch is not the short touch but the long touch for a relatively long configuration time (e.g., 1 second).

This instantaneous one-step decrease in volume may allow the user to immediately recognize entering the volume-down control mode, thereby improving the user's clarity of operation recognition.

By determining whether there is a continuous touch in this volume down mode in operation S140,
the method returns to a routine "S130" of decreasing the volume by one increment for each configuration time (e.g., 1 second) when the touch is the continuous touch, whereby the volume reduction is configured to a user's desired volume.

In a case in which the user wants to lower the volume in the above, since 2 touches, 3 touches, 4 consecutive touches, etc., are generally defined as other function key operations, it is desirable that the volume is reduced when a touch is made with an interval of 1 second or more.

Embodiment 2

Figure 3:
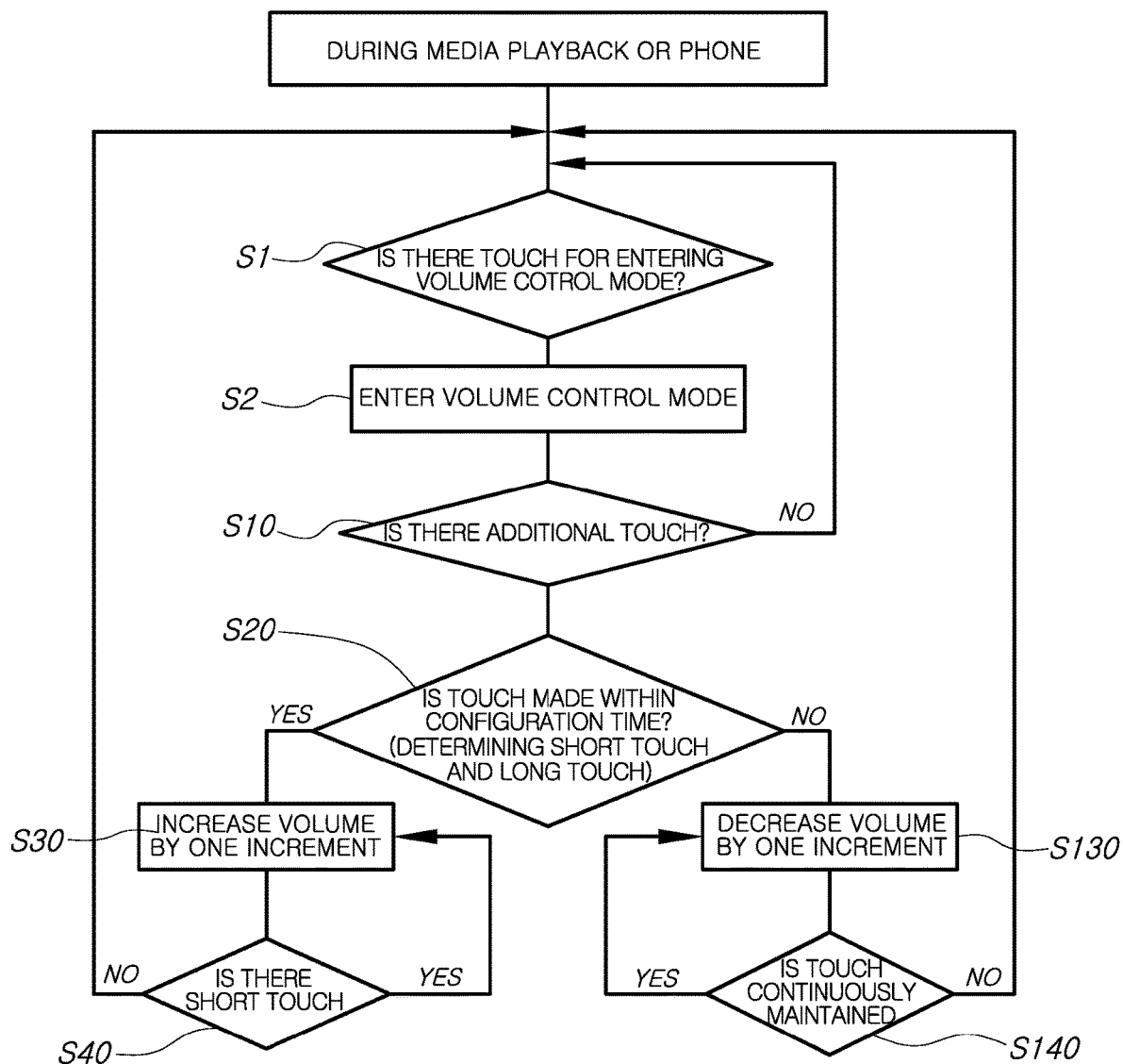
FIG. 3 is a flowchart illustrating a modified embodiment of the method for controlling the volume of the TWS Bluetooth earphone of FIG. 2.
Figure 4:
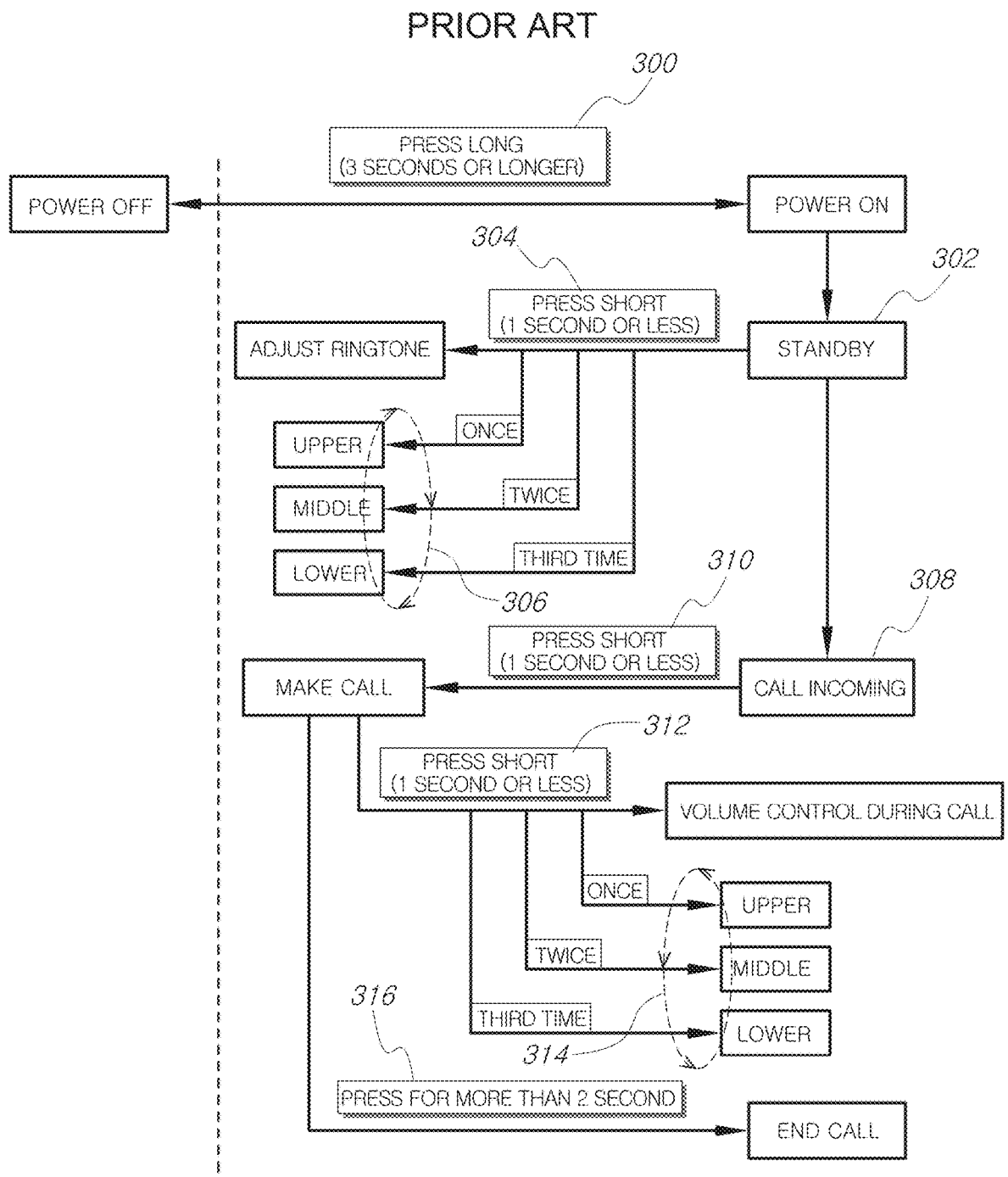
FIG. 4 is an operation explanatory diagram illustrating a method for controlling the volume of a TWS Bluetooth earphone according to the prior art.

In FIG. 3, in order to stably perform volume control when the volume control is intended,
whether there is a user's short touch on the touch switch TR or TL during media playback or a phone call is determined in operation S1, and when there is the short touch, the method enters the volume control mode in operation S2 and waits for the subsequent operation.

That is, in this embodiment, the volume control mode is configured separately.

Figure 2:
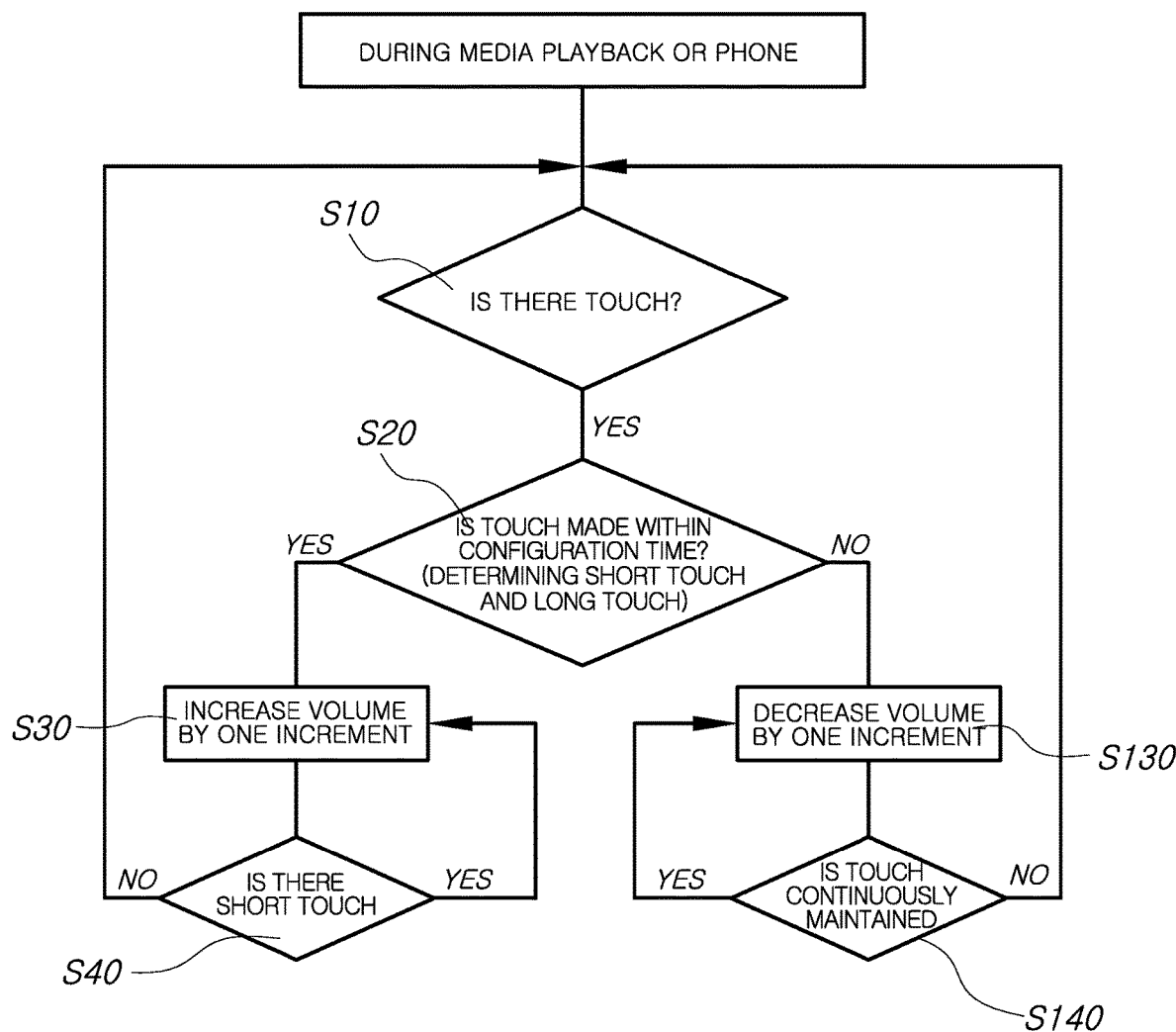
FIG. 2 is a flowchart illustrating a method for controlling the volume of a TWS Bluetooth earphone of the disclosure.

The subsequent operations are the same as those in the flowchart of the embodiment of FIG. 2.

A touch that allows to enter the volume control mode is preferably a short touch in view of a user usage pattern, but, if necessary, the touch can be designed as a configuration such as two consecutive touches.

In the above configuration, the volume is increased by one increment when there is a short touch and the volume is decreased by one increment when there is a long touch. However, it will be possible to configure the volume down for the short touch and the volume up for the long touch.

However, as described above, when the volume is suddenly and continuously increased as a continuous touch, the user may be surprised, so it is preferable to make the long touch operate for the volume down.

INDUSTRIAL APPLICABILITY

According to the method for controlling the volume of the TWS Bluetooth earphone according to the present disclosure, by using a button or a touch switch, which is a typical single function switch and changing the operation logic of the function switch without a separate mechanical button or the use of additional parts such as a touch switch type operation pad, it is possible to easily control the volume of the TWS Bluetooth earphone to increase customer convenience and improve product quality.

The invention claimed is:
1. A method for controlling volume of a true wireless stereo bluetooth earphone including a pair of left and right independent earphones, and one or more function switches in the left and right independent earphones of the true wireless stereo bluetooth earphone as a touch switch (TR or TL) or a mechanical button switch that responds to a user's touch, wherein the method is implemented during media playback or a phone call, the method comprising:
recognizing (S10) a user's touch on the touch switch (TR or TL) of the Bluetooth earphone (E);
determining (S20) whether the touch on the touch switch (TR or TL) is a short touch or a long touch determined based on a configuration time;

increasing (S30) the volume by one increment while immediately entering a volume-up mode when the touch on the touch switch (TR or TL) is a short touch;

determining (S40) whether there is an additional short touch on the touch switch (TR or TL) within the configuration time;

returning (YES: S40) to the increasing (S30) of the volume by one increment each time there is an additional short touch, according to the determining (S40);

returning (NO: S40) to checking whether a volume control mode is entered by exiting the volume-up mode when there is no touch on the touch switch (TR or TL) for the configuration time;

decreasing (S130) the volume by one increment by entering a volume-down mode when the touch on the touch switch is the long touch of the configuration time in the determining (S20) of whether the touch on the touch switch (TR or TL) is the short touch or the long touch;

determining (S140) whether the touch switch (TR or TL) is continuously touched in the volume-down mode; and returning to the decreasing (S130) of the volume by one increment when the touch switch (TR or TL) is continuously touched.

\* \* \* \* \*